US007032113B2

(12) United States Patent
Pendlebury (10) Patent No.: US 7,032,113 B2
(45) Date of Patent: Apr. 18, 2006

(54) NETWORK ENABLED APPLICATION SOFTWARE SYSTEM AND METHOD (75) Inventor: Ian Malcolm Pendlebury, East Doncaster (AU)

(73) Assignee: Moldflow Ireland, Ltd., Little Island (IE)

(*) Notice: Subject to any disclaimer, the term of this patent is extended or adjusted under 35 U.S.C. 154(b) by 822 days.

(21) Appl. No.: 09/844,466

(22) Filed: Apr. 27, 2001

(65) Prior Publication Data

US 2002/0016774 A1 Feb. 7, 2002

Related U.S. Application Data (60) Provisional application No. 60/200,634, filed on Apr. 28, 2000.

(51) Int. Cl.
H04L 1/24 (2006.01)

(52) U.S. Cl. ...................... 713/185; 713/182

(58) Field of Classification Search ........ 713/182–186, 713/200, 201, 202; 380/277
See application file for complete search history.

(56) References Cited

U.S. PATENT DOCUMENTS

| 4,685,055 | A |   | 8/1987  | Thomas ..................... 364/200 |
|-----------|---|---|---------|--------------------------------------|
| 5,103,476 | A | * | 4/1992  | Waite et al. ................. 705/59 |
| 5,109,413 | A |   | 4/1992  | Comerford et al. ............ 380/4 |
| 5,222,134 | A | * | 6/1993  | Waite et al. ................. 705/59 |
| 5,293,422 | A | * | 3/1994  | Loiacono .................... 713/200 |
| 5,313,592 | A |   | 5/1994  | Buondonno et al. ........ 395/325 |
| 5,414,851 | A |   | 5/1995  | Brice, Jr. et al. .......... 395/650 |
| 5,455,902 | A | * | 10/1995 | Ellson et al. ............... 345/473 |
| 5,553,139 | A |   | 9/1996  | Ross et al. .................... 380/4 |
| 5,586,186 | A | * | 12/1996 | Yuval et al. ................. 380/30 |
| 5,590,197 | A | * | 12/1996 | Chen et al. .................. 705/65 |
| 5,671,279 | A | * | 9/1997  | Elgamal ...................... 705/79 |
| 5,708,709 | A |   | 1/1998  | Rose ........................... 380/4 |
| 5,754,646 | A | * | 5/1998  | Williams et al. ............. 705/55 |
| 5,757,908 | A | * | 5/1998  | Cooper et al. .............. 713/165 |
| 5,787,000 | A |   | 7/1998  | Lilly et al. ............. 364/468.01 |
| 5,815,665 | A |   | 9/1998  | Teper et al. .......... 395/200.59 |
| 5,822,432 | A |   | 10/1998 | Moskowitz et al. .......... 380/28 |
| 5,855,007 | A | * | 12/1998 | Jovicic et al. ............... 705/14 |
| 5,933,497 | A |   | 8/1999  | Beetcher et al. .............. 380/4 |
| 5,933,816 | A |   | 8/1999  | Zeanah et al. ............... 705/35 |
| 5,933,830 | A |   | 8/1999  | Williams .................... 707/100 |

(Continued)

FOREIGN PATENT DOCUMENTS

EP 0 653 695 A2 5/1995

(Continued)

OTHER PUBLICATIONS

Matsumoto, Craig, "Single use software is a quantum leap", EE Times, Nov. 29, 1999. (2 pgs.).

(Continued)

Primary Examiner—Kim Vu
Assistant Examiner—Thomas Gyorfi
(74) Attorney, Agent, or Firm—Goodwin Procter LLP (57) ABSTRACT A system and method for allowing access to software to end users on a pay per use basis. The invention may be employed advantageously in a variety of scenarios, especially where there exists a need to provide end users with a method of accessing and executing large computationally intensive application software programs at low cost, on an as needed basis, in a secure manner, without the burden of excessive transmission times or large centralized vendor computer facilities. The invention is applicable to any pay per use method of distributing software and may be especially desirable where there are large data files, sensitive data, and/or computationally intensive applications.

18 Claims, 6 Drawing Sheets

U.S. PATENT DOCUMENTS

| | | | |
|---|---|---|---|
| 5,938,729 A | 8/1999 | Cote et al. .................. 709/224 |
| 5,982,892 A | 11/1999 | Hicks et al. | |
| 6,000,032 A | 12/1999 | Millard ........................ 713/201 |
| 6,008,737 A | 12/1999 | Deluca et al. ......... 340/825.34 |
| 6,049,789 A | 4/2000 | Frison et al. .................. 705/59 |
| 6,105,137 A * | 8/2000 | Graunke et al. ............. 713/201 |
| 6,233,567 B1 | 5/2001 | Cohen .......................... 705/59 |
| 6,314,409 B1 * | 11/2001 | Schneck et al. .............. 705/54 |
| 6,330,549 B1 * | 12/2001 | Merkle ......................... 705/51 |
| 6,343,284 B1 * | 1/2002 | Ishikawa et al. .............. 705/67 |
| 6,502,193 B1 * | 12/2002 | Barber ........................ 713/201 |
| 6,595,856 B1 * | 7/2003 | Ginsburg et al. ............. 463/29 |
| 6,651,169 B1 * | 11/2003 | Benson et al. .............. 713/193 |
| 6,681,212 B1 * | 1/2004 | Zeng ............................ 705/51 |
| 6,694,434 B1 * | 2/2004 | McGee et al. .............. 713/189 |
| 6,792,113 B1 * | 9/2004 | Ansell et al. ................ 380/284 |

FOREIGN PATENT DOCUMENTS

| | | |
|---|---|---|
| EP | 0 895 149 A1 | 2/1999 |
| WO | WO 95 35533 A | 12/1995 |
| WO | WO 99/16205 A1 | 4/1999 |
| WO | WO 9926123 A1 * | 5/1999 |
| WO | WO 99/34554 A2 | 7/1999 |
| WO | WO 99/34554 A3 | 7/1999 |

OTHER PUBLICATIONS

Doscher et al., "Sematech's experiences with the CIM Framework; software development for computer integrated manufacturing", Communications of the ACM, No. 10, vol. 40, pp. 82-84, Oct. 97. (5 pgs.).

Anderson, Kendall, "Custom software heads for classrooms Technology tools' to help kids K-5", The Dallas Morning News, Plano, p. 1G, Jun. 29, 1995. (3 pgs.).

Schuyler, Michael, "Baby Thought update; library plans a new computer network", vol. 12, No. 11, pp. 56-61, Computers in Libraries, Dec. 1992. (7 pgs.).

Foster, Thomas A., Why our computer systems don't work; need for logistics computer systems to meet customer's requirements; Editorial, vol. 91, No. 5, p. 4, Chilton's Distribution, May 1992. (2 pgs.).

"changing the way plastics parts and molds are designed," Feb. 1999, Moldflow Plastics Advisers. (6 pgs.).

Delcam Press Release, "Delcam's New Free Internet Authenticated Desktop Application (IADA), PS-Exchange, Offers a Fast and Secure Online Data Exchange Service," Mar. 2000 (2 pgs.).

http://www.upfrontezine.com/, upFront.eZine, Issue #197: Apr. 18, 2000 (9 pgs.).

http://www.upfrontezine.com/, upFront.eZine, Issue #198: Apr. 25, 2000 (8 pgs.).

English-language Translation of Sep. 25, 2004 Office Action in corresponding CN Patent Application 01807268.2.

* cited by examiner

NETWORK ENABLED APPLICATION SOFTWARE SYSTEM AND METHOD

CROSS-REFERENCE TO RELATED APPLICATIONS

This application claims priority to and the benefit of, and incorporates herein by reference, in its entirety, provisional U.S. patent application Ser. No. 60/200,634, filed Apr. 28, 2000. This application further incorporates herein by reference, in their entirety, PCT International Patent Application No. PCT/AU98/00130 (published on Oct. 1, 1998, as International Publication No. WO 98/43179), and U.S. patent application Ser. No. 09/404,932, filed on Sep. 24, 1999.

FIELD OF THE INVENTION

The invention relates generally to a computer network and method for providing restricted use of a software program and, more specifically, to an Internet-based system for providing an executable application program to an end user's computer for use on a restricted or limited basis.

BACKGROUND

One conventional method for providing an executable application program to an end user entails entering into a licensing agreement with the end user and providing the end user with the program for installation on the end user's computer or computer network via media such as a CD-ROM. An alternative installation method entails downloading the software program via a large scale computer network, such as the Internet. The cost of unlimited use licenses can be prohibitive, especially in the event the end user expects to use the program infrequently. This may also be the case where the application program is very large and/or complex, such as may be typical for computationally intensive analytical programs used by engineers and scientists for designing components and simulating complex physical processes. Large business application programs may have similar attributes. Also, large application programs require significant computer hardware resources and support to run optimally, which can also be expensive.

One alternative is to provide access to the application program on a time-share or other "as needed" basis by means of a centralized computer that many end users are able to access. According to this method, an end user's data, electronic model, etc., is uploaded to the centralized computer operated by a service provider, where the application is run. Upon completion, the results are downloaded to the end user in the form of a report, graphical model, etc. Accordingly, the end user avoids the necessity and associated cost of having to license the application program for use on the end user's system and only pays for access and use of the software when the need arises.

One hypothetical example of this alternative arrangement relates to the use of complex engineering software, such as that used in the simulation of polymer injection molding processes. Using a conventional time-share model, an end user sends a finite element model representing the geometry of a component to be produced from a computer system at their facility over a network to a computer system at the service providers facility. There, a computer simulation is performed by the service provider using the service provider's software and the results of the analysis are then sent back over the network to the end user's computer. A user fee is charged, which is typically proportional to the computer resources used to generate the results.

There are, however, several shortcomings associated with this methodology. For example, end users may be concerned with security, being reluctant to transmit their data over a public network where the possibility exists for unauthorized access, data corruption, etc. This may be especially the case where the data is private, confidential, or proprietary in nature. Further, end users may not be comfortable sending confidential data over the public network to reside on a computer beyond their control.

Also, where larger amounts of data must be uploaded, capacity limitations of the network may result in excessive transmission time. Accordingly, the time and cost to send the geometric or other data over the network might be high. Data file sizes for finite element models are usually of the order of twenty to fifty megabytes of data, and can be larger for more complex geometries.

For service providers, computer hardware having sufficient computing speed and access capacity must be provided in order for the system to be widely used and accepted. This is especially the case where there exist large numbers of end users which tend to want access to the system during certain peak periods. Failure to provide sufficient excess capacity to accommodate peak usage requirements can lead to end user dissatisfaction and ultimately disuse. Also, where larger amounts of data must be downloaded, capacity limitations of the network may result in excessive transmission time. Accordingly, the time and cost to send data, such as the simulation results, back to the end user is usually even greater than that required to send the finite element model.

The end user also has little control over the time taken to process the simulation, as it depends on the load on the server at the service provider and the number of jobs ahead of the end user's job in the queue, which can vary. This may require the end user to change their design process time line, requiring more lead time. Still further, there is often considerable trial and error in some complex analyses, such as modeling the injection molding design process, which may make several iterations of running the application of little practical value. The end user, however, is still charged a fee for each use.

Accordingly, there exists a need to provide end users with a method of accessing and executing large computationally intensive application software programs at low cost, on an as needed basis, in a secure manner, without the burden of excessive transmission times or large centralized service provider computer facilities.

SUMMARY OF THE INVENTION

According to one embodiment of a method of the invention, a network enabled application software distribution method includes providing a restricted use application software program to an end user by any of a variety of methods, such as downloading over a large scale integrated network, such as the Internet, or physical delivery of the software program via media such as a CD. The end user then loads the program onto the end user's computer, system, or network. In order to enable the application software program, communication is established between the end user's computer and another computer, typically a computer controlled by the provider of the application software program. An identification file or fingerprint file is uploaded from the end user's computer to the other computer, where the end user's identity may be determined. Once verified, a key file from the other computer is downloaded to the end user's computer. The key file permits the end user to then run the application software program on the end user's computer.

According to one embodiment of a system of the invention, a network enabled application software distribution system includes at least two computers having a communications link therebetween. An end user has a restricted use application software program loaded on the end user's computer, system, or network. In order to enable the application software program, communications are established between the end user's computer and another computer, typically a computer controlled by the provider of the application software program. Communications between the two computers include an identification file or fingerprint file which is uploaded from the end user's computer to the other computer, where the end user's identity may be determined. Once verified, a key file from the other computer is downloaded to the end user's computer. The key file permits the end user to then run the application software program on the end user's computer.

The invention is applicable to any pay per use method of distributing software and may be especially desirable where there are large data files, sensitive data, and/or computationally intensive applications.

In general, an Application Service Provider ("ASP") may offer a fee per use version of various software applications as an additional channel to new markets. Such markets may be characterized as containing a large number of potential end users who would not otherwise use the ASP's applications due to the cost required to purchase a license or their infrequent use of a particular software function.

By way of example only and not by way of limitation, according to one embodiment, such as the use of an application for the simulation of polymer injection molding processes, the ASP allows the application to be run on a pay per use basis on the end user's computer system instead of on the ASP's computer system. Because the simulation runs on the end user's computer, no large amount of data or proprietary data is sent over a public network. In general, a small security device is sent to the end user's machine which enables the simulation to run within a fixed set of rules that fit into the design process. The rules may include, in any combination: (i) a fixed number of different runs; (ii) only runs on the specific geometry or on a model with a particular geometry characteristic; and (iii) unlimited use for a specified time period with automatic time out which disables use of the application. Optionally, there may be the ability to re-run the simulation at a future time, if results were lost. Because the application is running on the end user's computer, the end user gains the ability to set priorities on when the job will be run.

One method of implementing such a system in an injection molding simulation scenario may include the following steps, which order is not necessarily fixed. The very first time the end user wishes to use the software, they attach to the ASP's e-commerce web site, select the simulation that they wish to run, and download an application to their local computer system. They then go through the installation procedure. This step need not be repeated for any future use of that application. When an end user wishes to run a simulation, the end user reads the geometric description of the component to be produced into the local application, enters set-up information, and selects execution. This triggers the application to develop a characteristic fingerprint of the job and to connect to the ASP's e-commerce web site.

Once the end user passes security and payment screening tests, a security key file, based on the fingerprint, is sent back to the end user's computer which enables the simulation to run. Subsequent attempts to run the application typically may not require a new security file to be downloaded, provided a same unique characteristic applies. According to one embodiment, the characteristic is a number, which is calculated from the geometry file, which is unique to that geometry file. In this embodiment, the end user may perform as many simulations on the same geometry as required varying process conditions, injection locations, etc. until the end user is satisfied with the results.

Clearly, the underlying methodology is not limited to simulation of injection molding processes, but may be applied beneficially to a wide range of applications including, without limitation, engineering, scientific, and business computer applications. For example, using a multimedia player analogy, a system according to the invention would allow the end user to access the multimedia player only to interact with a specific multimedia file. Once the specific file is "activated" (e.g., following the end user's payment of a fee), the multimedia player will operate on the file. If, for example, the file changes, the multimedia player will be inhibited from operating on the file until the file is "reactivated," typically by payment of another fee.

In some embodiments, the invention can be implemented in apparatus that performs calculations to generate and validate the fingerprint against the security key. As a high security option, the apparatus provides encryption and decryption of both the fingerprint and the security key, as needed.

In other embodiments, the methods of providing access to an application can be implemented in software. This software may be made available online and through download vehicles. It may also be embodied in an article of manufacture that includes a program storage medium such as a computer disk or diskette, a CD, DVD, or computer memory device.

Other aspects, embodiments, and advantages of the present invention will become apparent from the following detailed description which, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

The following detailed description will focus primarily on an embodiment of the invention as applied to the use of injection molding software; however, as will be readily apparent to those skilled in the art, the underlying software end user methodology is applicable to all manner of engineering, scientific, and business applications. All such embodiments, variants, and equivalents are considered to be within the scope of the invention.

Figure 1:
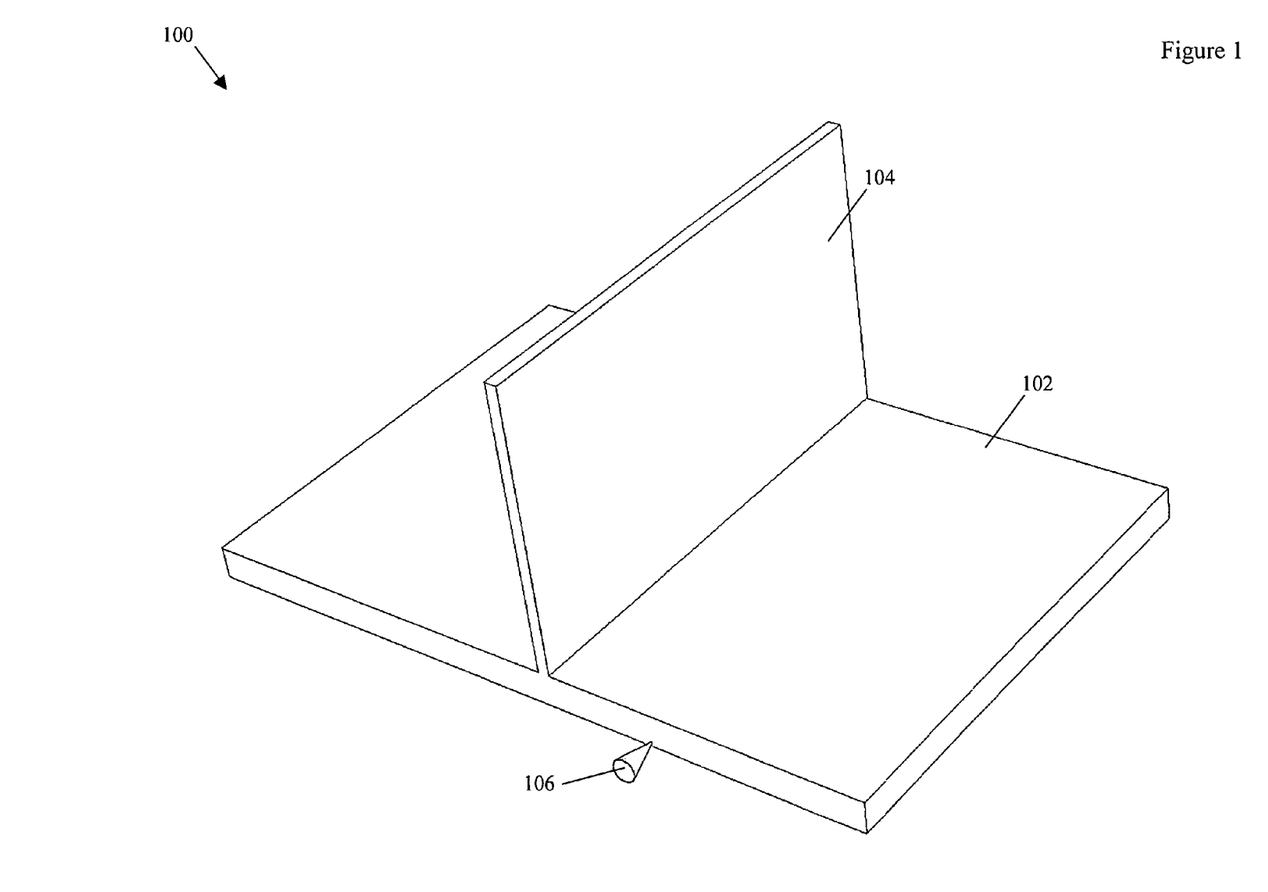
FIG. 1 is a schematic computer model showing a simple 3-D component consisting of a plate with a stiffening rib.

FIG. 1 is a schematic perspective view of a computer model showing a simple 3-D component 100 having a plate 102 with a generally perpendicularly disposed stiffening rib 104. A cone 106 indicates the point at which the plastic melt is to be injected into the mold to produce the component.

Figure 2:
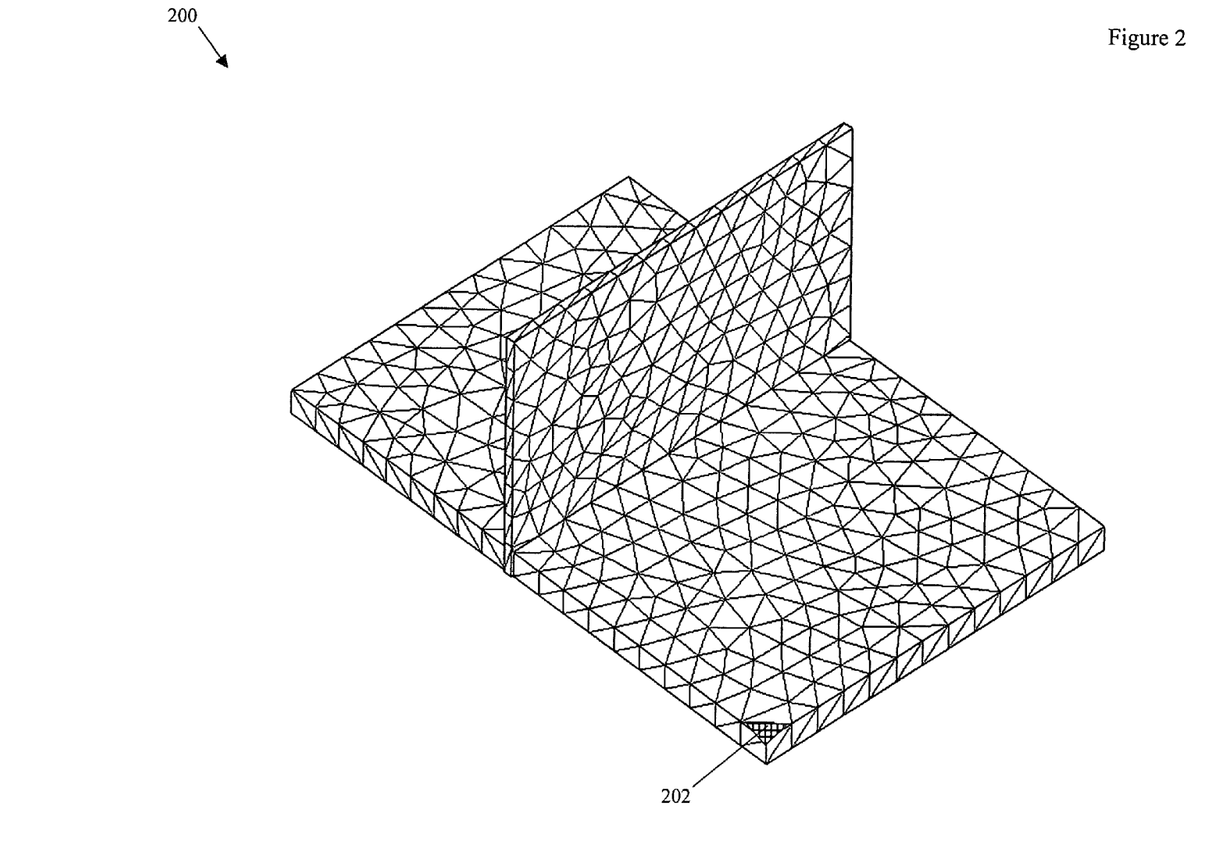
FIG. 2 is a schematic depiction of a surface mesh on the 3-D component geometry depicted in FIG. 1 which permits analysis by an injection molding simulation program.

FIG. 2 is a schematic depiction of a surface mesh 200 on the 3-D component geometry depicted in FIG. 1 which permits analysis by an injection molding simulation program. The type of simulation analysis used here is called "dual domain," which is not a full 3-D analysis, but is one type of analysis that can be used in accordance with the invention for relatively simple geometries. An example of dual domain analysis is disclosed in PCT International Patent Application No. PCT/AU98/00130, published on Oct. 1, 1998, as International Publication No. WO 98/43179, the disclosure of which is incorporated herein by reference in its entirety. A more complex 3-D analysis is disclosed in U.S. patent application Ser. No. 09/404,932, filed on Sep. 24, 1999, the disclosure of which is incorporated herein by reference in its entirety. Clearly, other types of simulation analyses can be employed and, accordingly, the invention is not to be considered as limited in this regard.

Figure 3:
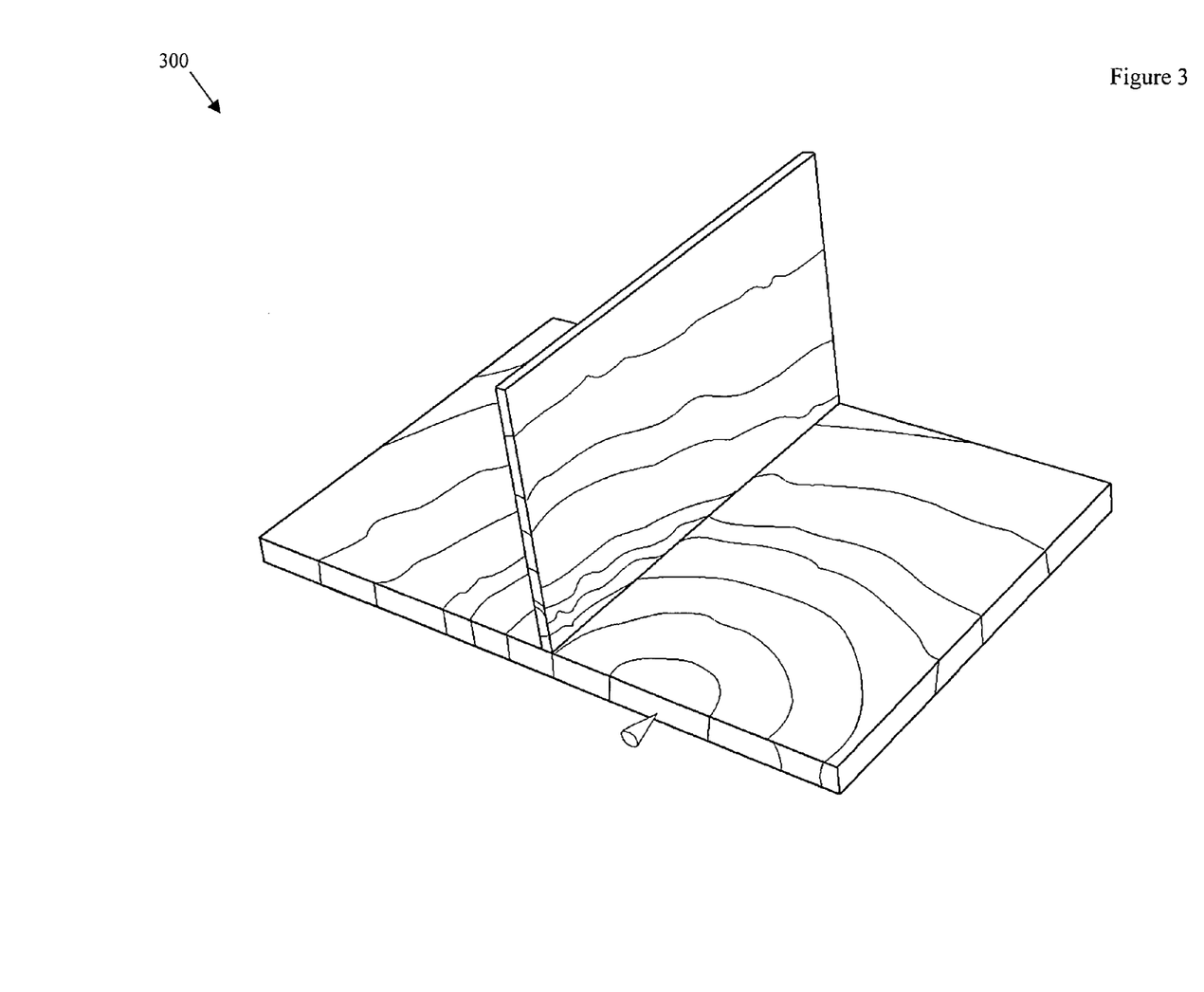
FIG. 3 is a schematic depiction of graphical results of the simulation program.

FIG. 3 is a schematic depiction of graphical results 300 of the simulation analysis for this component. The contour lines represent graphically the location of the plastic melt front at different time steps as the injected melt progressively fills the cavity mold.

Figure 4:
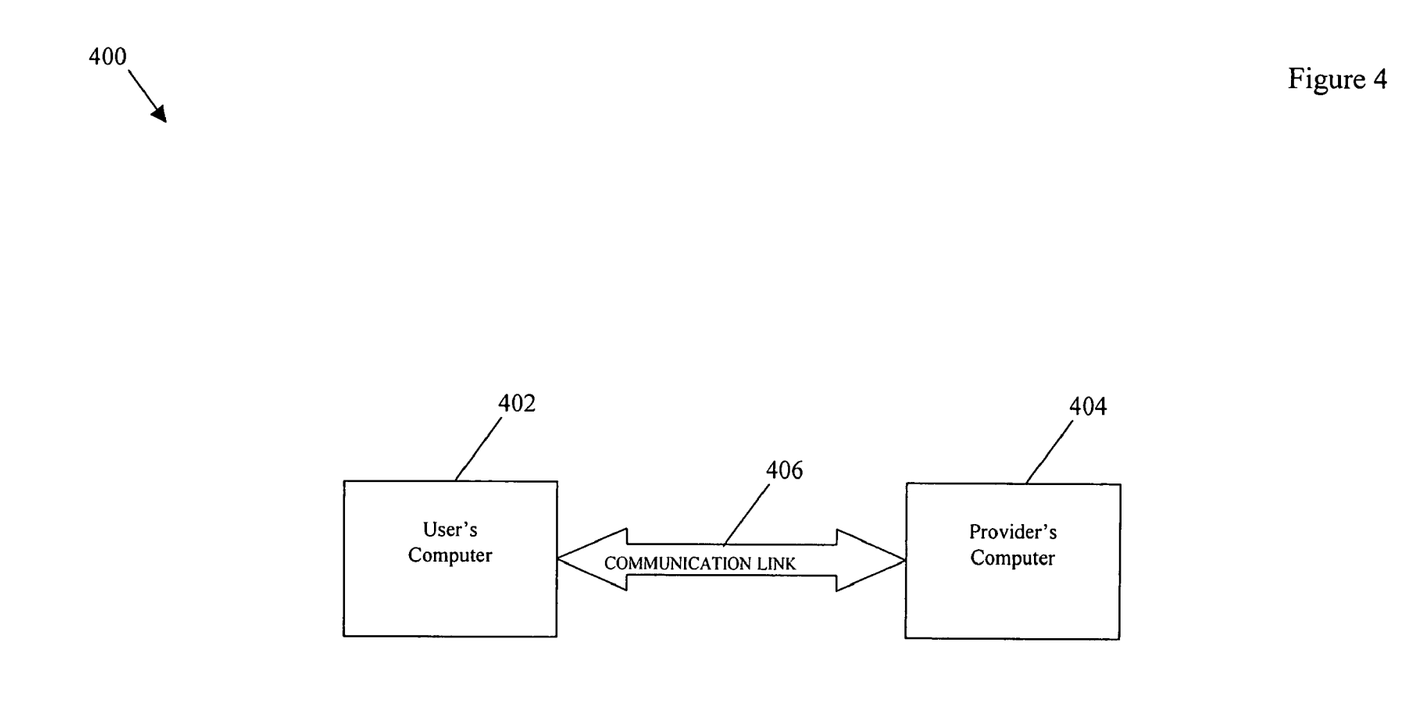
FIG. 4 is a schematic representation of a system in accordance with the present invention.

FIG. 4 is a schematic representation of a system 400 in accordance with the present invention, the system including an end user's computer 402, an ASP computer 404, and a communications link 406 therebetween.

Figure 5:
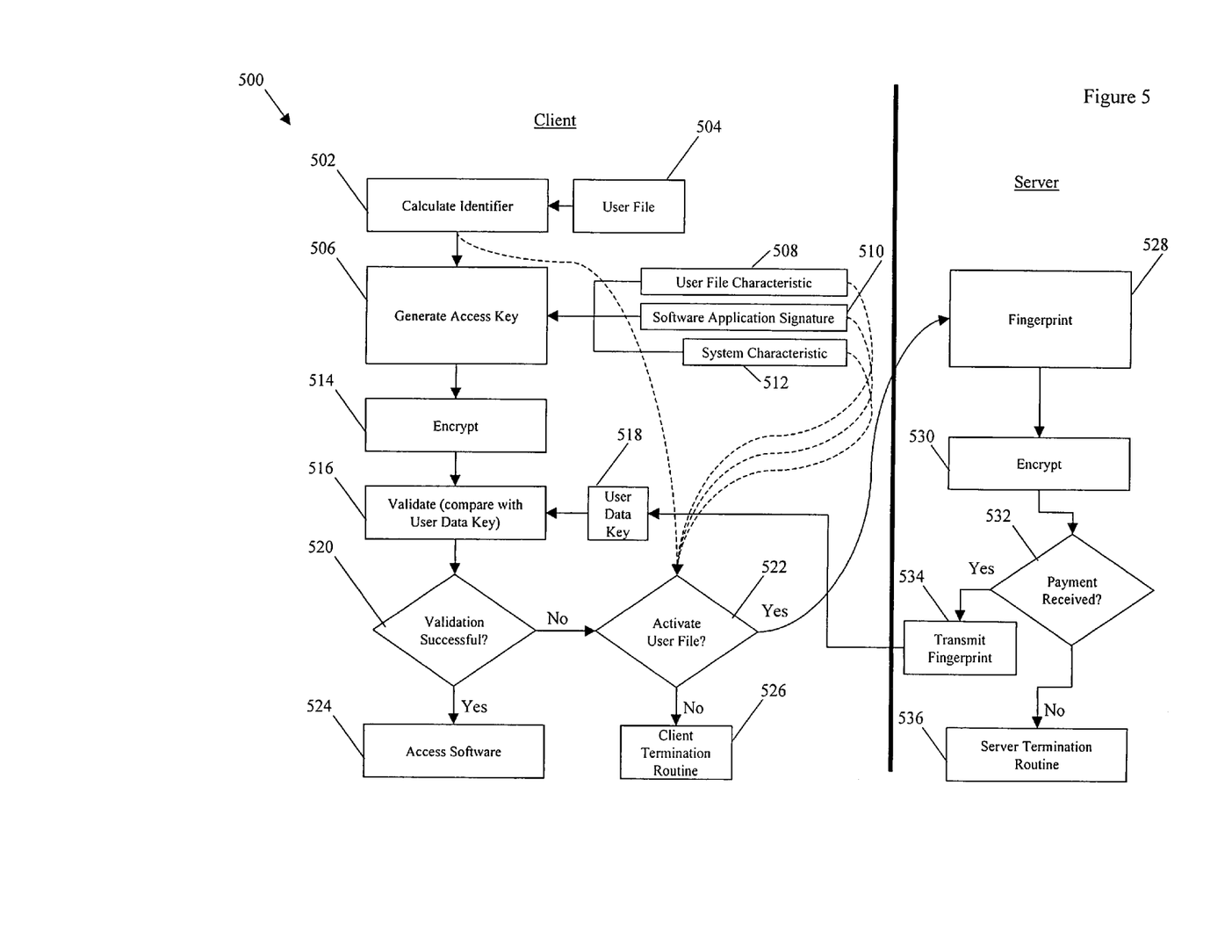
FIG. 5 is a workflow diagram of a client-server method for providing predetermined access to at least a part of a software application in accordance with an embodiment of the invention.

FIG. 5 is a workflow diagram of a client-server method 500 to provide predetermined access to at least part of a software application in accordance with an embodiment of the present invention. The software application operates on a user file 504. The predetermined access is typically a run permitted access, meaning the end user is allowed to access the application that will interact with the user file 504.

The user file 504 generally includes input data for the application. For example, the application may be word processing software. In this example, the user file 504 would correspond to a document produced, or to be operated on, by the word processing software. In the present embodiment, the user file 504 typically represents a computer model of a component to be constructed by injection molding. The user file 504 generally includes one or more file characteristics 508. In the context of the injection molding model, the file characteristics 508 typically include one or more of an element count, a node count, a name, and a match ratio. The element and node count characteristics describe the number of elements or nodes within the model, respectively. The name, typically provided by the end user, identifies the model. The match ratio describes the relation of the number of triangular elements that can be matched in pairs (from side-to-side of a surface meshed, thin walled geometry) to the total number of elements. For example, element 202 (shown crosshatched for clarity in FIG. 2) has a matched element at the same location on the underside of the surface of the 3-D component. (Given its location, the matched element is not visible in FIG. 2.) A purpose of the file characteristics 508 is to help identify whether the user file 504 has changed. If the user file 504 has changed, it is likely that one or more file characteristics 508 would change as well. Other types of file characteristics 508 that can also be used to indicate changes to the user file 504 include a center of gravity calculation, and a moment of inertia computation.

The client examines the user file 504 and calculates an identifier (step 502) that is based at least in part on the contents of the user file 504. In the present embodiment, the identifier includes a checksum that may be calculated according to the Cyclic Redundancy Check (hereinafter, "CRC") algorithm as discussed below. The client then generates an access key (step 506) that is based at least in part on the identifier. This access key can include one or more of the aforementioned file characteristics 508. The access key can also include a software application signature 510, such as the "build number" of the application. This build number typically provides information as to the creation date, or version, or both, of the application. Further, the access key can include one or more system characteristics 512 that are specific to the client device. An example of this would be the serial number of the client processor or platform. After the access key is generated (step 506), it is optionally encrypted (step 514). The encryption can be accomplished using any method, ranging from proprietary schemes to industry standard techniques.

After optional encryption, the access key is validated against a user data key 518 (step 116). The user data key 518 typically represents a previously calculated result that is based at least in part on the user data file 504. More specifically, the user data key 518 represents the initial state of the user data file 504. Validation includes comparing the access key with the user data key 518 (step 520). If the access key and the user data key 518 match, the validation is successful. There generally will not be a match when the user data file 504 has changed relative to its initial state due to, for example, modifications made to it by the end user. (Such modifications may be reflected in the file characteristics 508 that are included in the access key through the identifier.) In the case of a match, a system according to the invention grants the end user (and the corresponding user data file 504) access to the application (step 524). When a match is not accomplished, an activation routine is executed, as discussed below.

The access key may have a limited validity lifetime. In this case, the access key remains valid for a specific period. This period can be determined, at least in part, on, for example, the elapsed time from access key generation (step 506). After passage of a prescribed amount of time since access key generation (step 506), the access key would be rendered invalid, thereby preventing execution of the application. As an alternative, the access key could be rendered invalid after a number of access key validations. This would limit the number of uses of the application. As a further alternative, the access key could be rendered invalid if the frequency of access key validations exceeded a prescribed value, thereby limiting the frequency of use of the application. One or more of these methods of determining a period of validity could be combined to define new operational limits. For example, use of the application could be restricted based on both elapsed time and frequency of use.

The user data key 518 is typically generated as part of the aforementioned activation routine. This routine is executed when a comparison of the access key with the user data key 518 fails to indicate a match. In this case, the end user is given the opportunity to activate the user file 504 (step 522). (This activation ultimately allows access to the application.) If the end user declines to activate the user file 504, a client termination routine is executed (step 526) that precludes further access to at least a part of the application. Conversely, if the end user chooses to activate the user file 504, a server receives the identifier (provided to the activation routine) and includes it in a fingerprint 528. One or more of the file characteristics 508, as well as the software application signature 510, and the system characteristics 512, also provided to the activation routine, may also be included in the fingerprint 528, in any combination. The fingerprint may then be encrypted (step 530) using proprietary or industry standard techniques.

The fingerprint 528 is associated with the application as the user data key 518, thereby allowing the predetermined access to the application. Before this occurs, an embodiment of the invention determines whether payment associated with the user data key 518 has been received (step 532). Payment may be affected using a coupon transaction. For example, coupons can be purchased using a credit card, purchase order, or by mail order. Third Party Resellers can use their own billing procedures to resell coupons to their customers. The coupons are similar to a credit card. Associated with each coupon (typically by the encoding of each coupon) is a prescribed number of uses as well as information regarding the coupon point of purchase.

In place of entering a credit card number, the end user enters the coupon number (e.g., a 32 character string such as "FcGx7Nj1YjU8KfEq1agIVt4SNVojpa88"). The server then validates the coupon against a database of coupons sold or distributed. This verifies that the coupon is valid and has not been used more than the prescribed number of times. This is similar to typical credit card validation procedures.

Once payment is received, the fingerprint 528 is associated with the application as the user data key 518, typically by transmitting the fingerprint 528 to the client (step 534). In one embodiment, the fingerprint 528 is included in a dynamic link library file (hereinafter, "*.dll"), as described below. Consequently, the user data key 518 is then resident on the client. On the other hand, if payment is not received, a server termination routine is executed (step 536) and the fingerprint 528 is not associated with the application as the user data key. This precludes use of at least part of the user data file 504 with the application.

The plastics injection molding simulation method of one embodiment of the invention is an Internet enabled computer aided engineering ("iCAE") software product delivery method for the computer aided engineering ("CAE") marketplace. The method may include a unique pay-per-model pricing concept that allows an end user unlimited simulation access to a specific design model. Each model is defined by a unique fingerprint that is activated by a corresponding "model key" obtained from the ASP's e-commerce web site. One goal of iCAE is to extend the reach of an ASP's products to end users who cannot justify the purchase of a full price solution and to provide a low-risk getting started method that can lead to later full product purchases. Any number of software applications can be provided, such as an MPA® analysis or FUSION™ portions of MPI™. These programs are available for license from MoldFlow Corporation, Lexington, Mass., or its subsidiaries worldwide.

End users may begin iCAE by first obtaining (by download or through standard mail) an iCAE enabled Moldflow Plastics Advisers® ("iMPA") application, which may be free or provided at a nominal charge. With a few exceptions, as discussed below, this is basically a standard MPA software application which only operates on Internet enabled models. A function is added to the software product to limit activation to a given user model. Activation involves the creation of the model fingerprint, connecting to the ASP's e-commerce Internet web site to upload the fingerprint, paying for the model, and then downloading the model key. The ASP's e-commerce web site typically handles the creation of individual end user profiles, file upload and download, usage tracking, and end user billing activities. Billing may be done using credit card or other transactional techniques. Following is a description of typical product requirements for iMPA, the ASP's e-commerce web site, and the end user interaction between both systems.

Looking first to the usage scenario, in accordance with one embodiment of the invention, the following general steps may be involved in doing an analysis:

(i) browse the ASP's e-commerce web site;
(ii) educate the end user on benefits;
(iii) provide example usage scenario(s);
(iv) provide instructions on how to get started;
(v) if first time end user, register to create User Profile, which may be activated by an e-mail back to the end user containing a password and which may exclude certain end users from registering (e.g., end users with past payment issues);
(vi) log into secure area;
(vii) either download iMPA or request a CD to be mailed;
(viii) install iMPA on local end user computer by running Setup program;
(ix) run iMPA;
(x) for first time use, auto run tutorial (with an option "click here to not do this in the future");
(xi) read CAD model (e.g., STL, IGES, STEP, PARASOLID, etc.);
(xii) select "Start Analysis" icon or from menu selection. iMPA first validates that the CAD model is suitable for analysis with this simulation software. Checks can be made to ensure that the end user's model is acceptable and that the end user's computer is acceptable, this being done within iMPA before iMPA establishes the fingerprint, which may involve running through a "Pass 1, 2" subroutine to see how long it takes, how much memory is required, the mesh match ratio, etc. In the event of failures, for example when the mesh is too "chunky" in certain regions of the model to produce reliable results, a warning selected from a table of warnings of increasing severity can be displayed. Other warnings can be displayed when the model is wholly unsuitable for analysis or where the end user can proceed at their own risk, as in the case where the computer is too slow, has marginally sufficient memory, etc. The end user is given the preference of whether they would like their browser to be opened or not;
(xiii) if "OK to continue" is selected, create iMPA fingerprint file. A web browser is launched and connects to a front door of a secure area on the ASP's e-commerce web site;
(xiv) log in with end user ID and password;
(xv) the fingerprint file is manually or automatically uploaded by selecting "browse" to locate the iMPA file on the end user's computer hard drive. The activate button is chosen, which launches credit card or other transaction processing;
(xvi) present end user with bill summary, which the end user then pays by credit card or other accepted transaction method (e.g., the aforementioned coupon procedure) to activate the model;

(xvii) upon approval of bill payment, present end user with a download page to download the user data key file 518 (modelname_specialcode.dll, abbreviated as "*.dll"), which is downloaded and placed in the iMPA working directory; and (xviii) run iMPA (multiple times) to analyze/optimize model and view results, proceeding in a manner substantially identical to MPA analysis (e.g., specify input parameters such as gates, materials, process conditions, etc.; perform analyses such as process window, filling, runner balancing, etc.; post process the results; and create Internet ready reports).

Depending on the usage scenario, certain restrictions may be imposed. For example, the iMPA program may be disabled by imposing the restriction that any model geometry change invalidates the model and terminates the session.

There can be a variety of pricing options. For example, the ASP may choose to segment by model size (small, medium, large), model type (single cavity, multi-cavity, family mold), analysis type (gate location, process window, filling, runner balancing), number of analyses run limit, time limit, etc.

Due to the Internet e-commerce nature of the invention, security is a concern. Accordingly, it is important to take appropriate precautions to ensure that system security cannot be easily violated. For example, the system should make it virtually impossible for one key file to be used on more than one model or for the system to be compromised in other manners. Certain methods used to achieve this are described below.

For example, the model can be secured using a CRC, 16 bit ("CRC-16") algorithm. The CRC algorithm is a very powerful and easily implemented technique to obtain data reliability in data communications. The CRC technique is used to protect blocks of data called Frames and is a popular technique for error detection in data communications. The sender automatically applies a 16-bit polynomial to a block of data prior to transmission and appends the resulting cyclic redundancy code to the data. The receiver applies the same polynomial to the data to ensure the resulting cyclic redundancy code matches that of the sender. The CRC uniquely identifies the block of data, which in this application is the contents of a file. If any byte of data within the file changes, the CRC value changes as well. In data communications this would cause a packet failure. In this application, this will cause a security failure. Reportedly, a 16-bit code detects all single and double-bit errors and detects 99.998% of all errors.

The CRC value of the model along with the model name and model statistics (e.g., number of nodes, number of elements, mesh match ratio, CAD data source, etc.) are encrypted and sent to the web server. The web server unencrypts the data and compiles it into a new security dynamic link library file (i.e., *.dll). This library file is then sent directly back to the end user. Upon receipt, the end user puts the library file into the correct location (e.g., the "iMPAbin" directory) and loads it, to be ready to run the model.

When iMPA is run, it loads *.dll and sends it a password to verify it is the known and trusted *.dll, which includes a hard coded password unrelated to the iMPA application. When the end user opens a model file, its name is passed to *.dll, where it is compared with the registered list. If found, the CRC value is checked and if correlated, the model is passed for analysis. The CRC value within *.dll is not visible to the end user and cannot be found using utilities such as "strings" and, therefore, is quite secure. As an additional level of security, the *.dll contains a self-CRC check, so if anyone tries to modify (e.g., "hack") the *.dll, it will fail.

Accordingly, with the exception of the model fingerprint file, all end user data remains local on the end user's system. The fingerprint file only contains data sufficient to uniquely identify it. No end user proprietary information is transmitted to the ASP at any time. To ensure end user privacy, the data contained in the User Profile at the ASP's e-commerce site is used by the ASP for internal identification and tracking purposes only and should not be transmitted or sold to any third parties.

Any of a variety of billing methods can be used. A credit card can be used as an alternative to the coupon described above. One present credit card method is that employed by CyberSource™. Another credit card method is that employed by CyberCash™. In general, a customer places an order on the merchant's web site by hitting the PAY button. The merchant securely transfers order information to the credit card transaction service provider ("TSP") over the Internet via the Simple Commerce Messaging Protocol ("SCMP"). The TSP routes the transaction authorization request through its payment gateway to the processor or acquiring bank (i.e., the merchant's bank). The transaction is then routed to the card association. The card association routes the transaction to the issuing bank (i.e., the customer's bank) to request transaction authorization, which is not necessary for certain credit card issuers such as AmEX™ and Discover™. The issuing bank returns authorization to the card association; however, if the transaction is not authorized, the TSP returns a message to the merchant and remaining portions of the transaction are cancelled.

When the TSP receives transaction authorization, and if physical fulfillment is required, the TSP sends a message to the merchant or distribution center authorizing order fulfillment. The merchant or distribution center sends the TSP a fulfillment notification to permit settlement and the TSP sends a settlement request to the issuing bank. If the authorization is for the sale of digitally delivered product or service, the settlement request is made concurrent with the authorization. The issuing bank then approves transfer of money to the acquiring bank.

Internet enabled applications, such as iMPA, may have certain differences from their conventionally supplied counterpart applications, such as MPA. For example, iMPA may be configured to work with only a subset of operating systems and to analyze solely i-enabled models. There may, optionally, be a way to convert iMPA into a full MPA application product, for example through the use of a license key or the like. iMPA is small enough to download efficiently on the Internet. Accordingly, there may be a need to create a subset of large Help and Examples models to achieve the desired size. iMPA can be provided initially in English language only, which can be extended to include other languages that can be downloaded as language patches from the web site. iMPA, however, includes a new function to validate and then activate a model by connecting to the Internet. Further, iMPA can include a new function to display a list of all presently activated models of the end user.

The ASP's e-commerce web site can contain a large variety of content to support various needs of its customers. In one embodiment, the content can be centered around three primary themes. First is a set of internet enabled software solutions and data structures that automate, optimize, monitor, and facilitate the injection molding design-through-manufacturing process. Second is an e-commerce environment to quickly and efficiently offer goods and services of the ASP as well as other industry related entities to the marketplace. Third is an online environment for plastic part and mold design, collaboration, bidding, and manufacturing.

As may be readily appreciated, this broad set of goals need not be implemented fully initially, but rather can be implemented on an incremental basis, building from an set of baseline services. For example, beyond iMPA, the pay-per-model simulation methodology described hereinabove, initial baseline services may include implementation of individual end user profiles, such that a single common end user profile may be utilized by a single end user throughout various sections of the site, not just at the iMPA section. The baseline site may also include a Materials Online section, affording an end user the ability to browse through a materials database containing materials information, specifications, etc., as well as order material testing online. A Consulting Services section may be provided, affording an end user the ability to order consulting services directly over the Internet. Additionally, training class and sales seminar registration services can be provided. Note that while these baseline services could contain solely ASP content, third party products and content may be included as well. Accordingly, the ASP's e-commerce site can be positioned as an industry resource, sponsored by the ASP, but also including third party information.

The iMPA section may have a variety of page selections. The primary web page, reached from the ASP's e-commerce site home page, may include the following five end user selections: REGISTER FOR ACCOUNT; LOGIN; DEMO/TUTORIAL; GETTING STARTED; and NEWS/INFO.

The REGISTER FOR ACCOUNT selection presents a form to capture all required end user profile fields and e-mails an end user an introductory letter that informs the end user of their end user ID (e.g., the end user's e-mail address) and of their initial password. All fields, including the password, may be changed by the end user in the USER PROFILE area, as discussed more fully hereinbelow.

The LOGIN selection presents the end user ID and password fields, along with a login button. This selection may be advantageously located directly on the iMPA main page to allow the end user to login directly to the secure area of the site.

The DEMO/TUTORIAL selection leads an end user to a slide show tutorial on features and benefits of using the iMPA and GETTING STARTED provides instructions in a step 1, 2, 3 format.

Lastly, the NEWS/INFO section leads end users to a new/info page, which may contain recent industry news, press releases, success stories, quotes from satisfied customers, a frequently asked questions section, etc.

The USER PROFILE may contain both end user visible fields and system fields used solely by the ASP. The following fields are typical, although other fields could certainly be defined and tailored to a particular application.

End user visible fields may include the following: FIRST_NAME; LAST_NAME; POSITION; COMPANY_NAME; ADDRESS_1; ADDRESS_2 (i.e., an optionally defined field); CITY; STATE; COUNTRY; POSTAL_CODE; TELEPHONE_NUMBER; and FACSIMILE_NUMBER.

Additional visible fields may include: JOB_FUNCTION selected from a fixed selection list including part designer, mold designer, procurement engineer, material supplier, engineering consultant, other; LINE_OF_BUSINESS selected from a fixed selection list including Aerospace, Automotive, Building, Computers, Consultant, Consumer Goods, Distributor, Education, Electronics, Equipment Supplier, Furniture, Material Supplier, Medical, Mold Design/Maker, Toys, other; COMPANY_SIZE selected from a fixed selection list including 1–10, 11–25, 26–100, 100–1000, >1000 persons; EMAIL_ADDRESS which is also used as login end user ID, and PASSWORD which is generated the first time by the web site and which may be changed by the end user thereafter.

In general, all fields are required except ADDRESS_2. The end user's login ID is the end user's e-mail address. The PASSWORD field is generated by the web site and e-mailed to the end user, after which the end user may change it at will. This is done to ensure the ASP has a valid e-mail address.

As mentioned above, the USER PROFILE may also include a variety of system fields which are invisible to the end user, such as the following: iMPA_DOWNLOADS identifying the number of times iMPA has been downloaded or sent by mail; iMPA_LAST_DOWNLOAD_DATE listing the date iMPA was last downloaded or mailed; and iMPA_DOWNLOAD_VERSION identifying the iMPA version last downloaded or mailed.

iMPA_MODEL_ACTIVATION_TABLE, which is an open ended table that contains data on each model activated, may include for each model: ACTIVATION_DATE; ACTIVATION_TYPE which is an integer flag that can be tied to different SKUs; ACTIVATION_COMMENT which is a comment string that can be used to describe the model activated, being entered on the web page, and is only typically used to provide the ASP with some insight into what is actually being analyzed; AMOUNT_PAID in US dollars; DELETED_BY_USER which is a true/false flag to indicate whether the end user has removed this record from their managed list; MODEL_NAME; MODEL_NODES; MODEL_ELEMENTS; MODEL_MESH_MATCH_RATIO; and MODEL_SOURCE which is an integer designating the commercial source of the model code (e.g. 1="STL", 2="STEP", 3="IGES", 4="PARASOLID", etc.). It should be noted that all such MODEL_xxxxx data can be obtained from the fingerprint uploaded from the end user's computer system.

The capability exists to define additional fields, as required, depending on experience as the end user base grows and as the web site grows. For example, there could be fields specific to material browsing or material testing services, consulting services, etc.

As mentioned hereinabove, there is also a secure area of iMPA having a number of selections. As a baseline, there may be six primary selections in the secure area: OVERVIEW; GET iMPA; ACTIVATE MODEL; MY PROFILE; CONTACT US; and LOGOUT. These selections may be organized like a tabbed dialog form.

The OVERVIEW section is displayed when first entering the secure area and may contain a general description of the secure area. There are typically links to overview the iMPA process including, for example, links to DISCLAIMER and SECURITY POLICY pages. The first time in, the end user is required to display and read both pages. Any refund policy information, if any, should also be required to be displayed.

The GET iMPA section typically provides information regarding methods to obtain iMPA, along with a description of computer requirements, installation instructions, and general usage information. In one embodiment, two selections are possible, download iMPA or order a CD to be mailed. In either case, the end user's profile is logged whenever an end user orders or downloads iMPA.

The ACTIVATE MODEL section may be used either to activate a new model or manage the list of previously activated models. When entering this page, the fingerprint information (i.e., model name, number of nodes, number of elements, and mesh match ratio only) are loaded and displayed using browser cookies. For security purposes, the CRC is not displayed. If, for any reason, the fingerprint information cannot be displayed, the end user selects a file explicitly using a text input field and connected file "Browse . . . " button.

Once ACTIVATE MODEL is selected, the end user is presented with the total cost and prompted to agree to payment. After confirmation, the end user is connected to the payment service where all credit card entry and validation functions are performed, as discussed hereinabove.

It is generally desirable to display and manage all previously activated models here, especially for the case where there is only one *.dll per installation of iMPA. It contains the list of all activated models and the end user may need to be able to activate one or more models on a repeated basis. In general, the end user should be able to list the activated models, delete a model from the displayed list (but typically not from the ASP's internal database) and select which models will be put into *.dll.

Finally, after payment is complete, the validated end user is directed to a page where they can download the user data key file 518 (*.dll). This page typically contains a prompt to include all of the end user's models in the user data key file 518 as a default condition or to select which ones to include. If the end user picks SELECT MODELS they are directed to a page containing a table of all their models and will be give the choice to select or delete each model entry.

Following, as Table 1, is an example of typical information presented. (This page can be accessed from the main ACTIVATE MODEL page as well, in order to allow the end user to manage existing models.)

TABLE 1

| Model Name | Model Description | Date Activated | Activation Type | Include in Key file | Delete Model |
|---|---|---|---|---|---|
| face_plate.mpa | Filling-design concept 1 | Feb. 15, 00 | 1 | [✓] | [ ] |
| face_plate2.mpa | Filling-design concept 2 | Feb. 26, 2000 | 1 | [✓] | [ ] |
| cover.mpa | Final design | Feb. 27, 2000 | 1 | [✓] | [ ] |
| housing.mda | Runner balance | Feb. 27, 2000 | 2 | [✓] (Activate) | [✓] (Delete) |

Activation Type:
1 = Part Adviser model
2 = Mold Adviser model

The MY PROFILE section lists editable end user profile fields, along with a submit button, allowing the end user to update any profile information or to correct any information. This section typically will not list any iMPA model information and may only be accessed from the ACTIVATE MODEL page.

The CONTACT US section presents telephone contact information, as well as a form to submit comments by e-mail. This section may also contain details on how to get web and telephone support, as discussed further below under TECHNICAL SUPPORT. Lastly, selection of the LOGOUT section prompts the end user then logs them out of the secure area.

High quality demos and tutorials may be advantageously employed to enhance the likelihood of commercial success of systems in accordance with the invention. For example, there may be a web based demo that graphically presents value proposition of the pay-per-use methodology. A startup tutorial may be provided outlining the steps required to perform a relatively simple injection mold filling analysis. This tutorial may include a roadmap to other tutorials.

Technical support may be provided by the internal technical support staff of the ASP. One method for fulfilling a support request is through the e-commerce web site. A form is filled out by the end user and submitted through the web site. The information is then forwarded to the technical support staff where the information may be recorded for tracking purposes. The support request is then assigned to an appropriate engineer, software specialist, or other technical person to be resolved. The technical person may contact the end user using e-mail, telephone, or facsimile, as appropriate.

There may or may not be a charge for support calls. For example, there may be no charge for inquiries of a general nature or those that require less than a certain amount of support staff time to address. However, there may be a charge for calls that require specific engineering input, such as those requiring model manipulation, materials selection, or interpretation of analysis results. The charge may be a flat rate per inquiry or may be on a timed basis.

Figure 6:
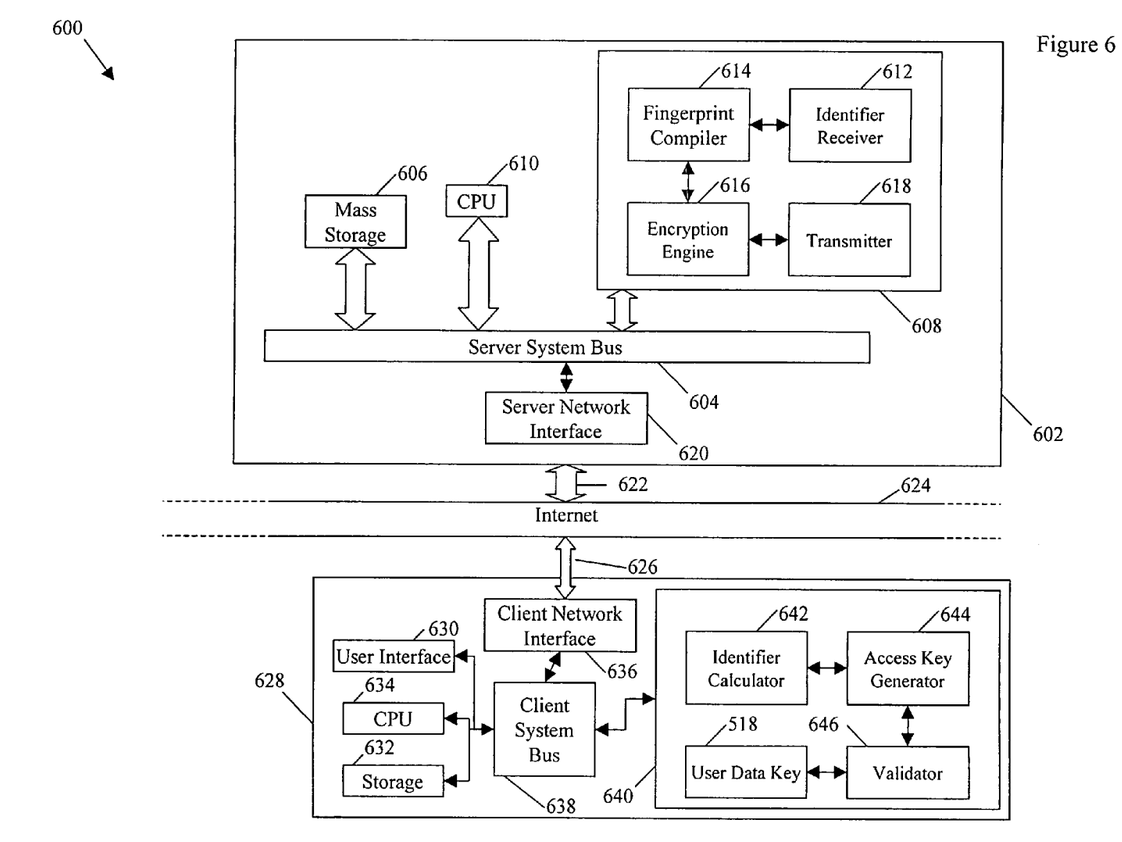
FIG. 6 is a schematic view of a hardware and software system constructed in accordance with an embodiment of the invention.

FIG. 6 shows a representative client-server implementation of the invention 600 that includes a server 602 and a client 628, which communicate over a medium such as the Internet 624. The server 602, which generally implements the functions of the invention, is shown in greater detail. The components of server 602 intercommunicate over a main bi-directional server system bus 604. The main sequence of instructions effectuating the invention reside on a server mass storage device 606 (in, e.g., a hard disk or optical storage unit) as well as in a main system memory 608 during operation. Execution of these instructions and effectuation of the functions of the invention is accomplished by a central processing unit ("CPU") 610. Within the server 602, a server network interface 620 is connected to the main bi-directional system bus 604. The server 602 is connected to the Internet 624 via the network interface 620 over a communication link 622.

The executable instructions that control the operation of the CPU 610 and thereby effectuate the functions of the invention are conceptually depicted as a series of interacting modules resident within a memory 608. (Not shown is the operating system that directs the execution of low-level, basic system functions such as memory allocation, file management and operation of the client mass storage device 606.)

The client 628 also generally implements the functions of the invention, and is shown in greater detail. The client 628 typically includes a user interface 630 and a client mass storage device 632, all of which are managed by a client CPU 634. These components communicate with each other, as well as with a client memory 640 and a client network interface 636, over a bi-directional client system bus 638. The user interface 630 typically includes a monitor and one or more input devices, such as a keyboard or mouse, or both. Similar to the server configuration discussed above, instructions effectuating the invention reside on the client mass storage device 632 (in, e.g., a hard disk or optical storage unit) as well as in the client memory 640. Execution of these instructions and effectuation of the functions of the invention is accomplished by the client CPU 636. Within the client 628, the client network interface 636 is connected to the bi-directional client system bus 638. The client 628 is also connected to the Internet 624 via the client network interface 636 over a communication link 626. The executable instructions that control the operation of the client CPU 634 and thereby effectuate the functions of the invention are conceptually depicted as a series of interacting modules resident within client memory 640. (Not shown is the operating system that directs the execution of low-level, basic system functions such as memory allocation, file management and operation of the client mass storage device 632.)

An identifier calculator 642 communicates with a user file. This file, typically stored on the client mass storage device 632, includes data to be presented to a software application for further processing and analysis. In one embodiment, the software application simulates polymer injection molding processes, and the user file includes a model of the component to be manufactured using these processes. The identifier calculator 642 examines the contents of the user file and computes an identifier, typically a checksum based on a CRC. The identifier calculator 642 communicates with an access key generator 644, which receives the identifier and, optionally using ancillary information, generates an access key. The ancillary information can include file and system characteristics, and a software application signature, as discussed above. A validator 646 communicates with the access key generator 644 to compare the access key with a user data key 518. The validator 646 also provides any encryption and decryption needed for the comparison. If the access key matches the user data key 518, access to the application is permitted.

If the access key does not match the user data key 518, the end user is offered the opportunity to "activate" the user file. If the end user chooses to activate the user file, the identifier is transmitted to the server 602, typically using a network, such as the Internet 624, over communication links 622, 626. The communication links 622, 626 may take many and differing forms. Typical examples include high-speed dedicated lines, wireless links, as well as simple dial-up connections. It should also be noted that communication between the server 602 and the client 628 may be performed over a medium other than the Internet 624. Any network, such as an intranet or other proprietary communications medium may substitute for the Internet 624 and still remain within the scope of the present invention.

An identifier receiver 612 receives the identifier and communicates with a fingerprint compiler 614. Using the identifier and the optional ancillary information detailed above, the fingerprint compiler 614 generates data that will ultimately become the user data key. In one embodiment, the data are included in a dynamic link library file and reflect the composition and structure of the user data file, the software application, and the client 628. The fingerprint compiler 614 optionally communicates with an encryption engine 616 to encrypt the data, thereby rendering the dynamic link library file resistant to tampering. A transmitter 618 then sends the data to the client 628 as the user data key 518.

Note that because FIGS. 4, 5, and 6 are block diagrams, the enumerated items are shown as individual elements. In actual implementations of the invention, however, they may be inseparable components of other electronic devices such as a digital computer. Thus, actions described above may be implemented in software that may be embodied in an article of manufacture that includes a program storage medium.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes which come within the meaning and range of equivalency of the claims are therefore intended to be embraced therein.

What is claimed is:

1. A method for allowing a predetermined access to at least a subset of a software application, the method comprising the steps of:
   calculating an identifier based at least in part on a user geometry file, wherein the user geometry file corresponds to an injection molded component;
   generating an access key based at least in part on the identifier; and
   validating the access key against a user data key and, on successful validation, granting the predetermined access to at least a subset of the software application thereby enabling operation of the software application with the user geometry file, wherein access is limited to execution of the software with the geometry file of the injection molded component.

2. The method of claim 1 further comprising the step of executing an activation routine on unsuccessful validation.

3. The method of claim 1 wherein the predetermined access comprises run permitted access.

4. The method of claim 1 wherein the user geometry file comprises input data for the software application.

5. The method of claim 1 wherein the identifier comprises a checksum based at least in part on a cyclic redundancy check.

6. The method of claim 1 whoring the user geometry file includes at least one file characteristic.

7. The method of claim 6 wherein the at least one file characteristic comprises at least one of an element count, a node count, a model name, and a match ratio.

8. The method of claim 6 wherein the access key further comprises the at least one file characteristic.

9. The method of claim 1 wherein the access key further comprises a software application signature.

10. The method of claim 1 wherein the access key further comprises at least one system characteristic.

11. The method of claim 1 wherein the access key is encrypted.

12. The method of claim 1 wherein the access key has a limited validity lifetime.

13. The method of claim 12 wherein the limited validity lifetime is determined at least in part by at least one of an elapsed time from access key generation, a number of access key validations, and a frequency of access key validations.

14. The method of claim 1 wherein the user data key comprises a previously calculated result based at least in part on the user geometry file.

15. The method of claim 1, wherein the software application comprises process simulation software.

16. The method of claim 15, wherein the validating step comprises validating the access key against a user data key and, on successful validation, granting the predetermined access to the process simulation software, thereby enabling process simulation with the user geometry file.

17. The method of claim 15 wherein the software application performs a simulation of an injection molding process.

18. A network enabled application software distribution method including the steps of:
proving a restricted use application software program;
loading the program onto a user's computer;
establishing communications between the user's computer and another computer;
uploading a fingerprint file from the user's computer to the other computer, wherein the fingerprint file is based at least in part on a user geometry file corresponding to an injection molded component;
downloading a key file from the other computer to the user's computer; and
running the application software program on the user's computer with the user geometry file, wherein access is limited to execution of the software with the geometry file of the injection molded component.

* * * * *

UNITED STATES PATENT AND TRADEMARK OFFICE
CERTIFICATE OF CORRECTION

| | | |
|---|---|---|
| PATENT NO. | : 7,032,113 B2 | Page 1 of 1 |
| APPLICATION NO. | : 09/844466 | |
| DATED | : April 18, 2006 | |
| INVENTOR(S) | : Pendlebury | |

It is certified that error appears in the above-identified patent and that said Letters Patent is hereby corrected as shown below:

In Claim 6, column 16, line 46, delete the word "whoring" and insert the word --wherein--

Signed and Sealed this

Eighteenth Day of July, 2006

JON W. DUDAS
*Director of the United States Patent and Trademark Office*